United States Patent [19]

Barbieri

[11] Patent Number: 4,803,917
[45] Date of Patent: Feb. 14, 1989

[54] AUTOMATIC APPARATUS TO COOK AND SERVE READY-TO-EAT PASTA HELPINGS AFTER THE ITALIAN MANNER

[76] Inventor: Giovanni Barbieri, via Marosticana n. 18, Dueville (Vicenza), Italy

[21] Appl. No.: 141,093

[22] Filed: Jan. 5, 1988

[30] Foreign Application Priority Data

Jan. 7, 1987 [IT] Italy .......................... 84901 A/87

[51] Int. Cl.$^4$ .................. A47J 27/00; A47J 27/10; A47J 27/18
[52] U.S. Cl. ................................ 99/356; 99/407; 99/410; 99/414; 99/494
[58] Field of Search ............... 99/494, 327, 516, 536, 99/483, 357, 403, 404, 407–410, 336, 330, 331, 348, 414, 353–356; 426/509, 510; 118/24, 25

[56] References Cited

U.S. PATENT DOCUMENTS

| 4,214,514 | 7/1980 | Contino et al. | 99/330 |
| 4,245,581 | 1/1981 | Spencer | 99/494 |
| 4,359,935 | 11/1982 | Murray | 99/407 |
| 4,450,757 | 5/1984 | Alfio | 99/408 |
| 4,505,193 | 3/1985 | Mariotti | 99/330 |
| 4,543,878 | 10/1985 | Luchetti | 99/330 |
| 4,569,277 | 2/1986 | Stiglich | 99/348 |
| 4,635,812 | 1/1987 | Mueller | 99/403 |
| 4,685,386 | 8/1987 | Bezon | 99/404 |

*Primary Examiner*—Timothy F. Simone
*Attorney, Agent, or Firm*—Browdy & Neimark

[57] ABSTRACT

An automatic apparatus to cook, season and serve helpings of ready-to-eat pasta such as for example helpings of spaghetti, ravioli and the like. The apparatus essentially includes a cooking vessel supplied with boiling water coming from a boiler movable between a higher and lower position respectively, a basket designed to contain one pasta helping to be cooked and disposed above the cooking vessel so that it can be introduced thereinto when the latter is at its higher position, a basket-charging device which takes up a pasta container, transports it and discharges the contents thereof inside basket, a conveyor designed to put a dish under the basket so that the basket may discharge the cooked pasta helping thereon, and a condiment-dispensing member which puts a predetermined condiment quantity on the cooked pasta helping laid down on the dish.

11 Claims, 4 Drawing Sheets

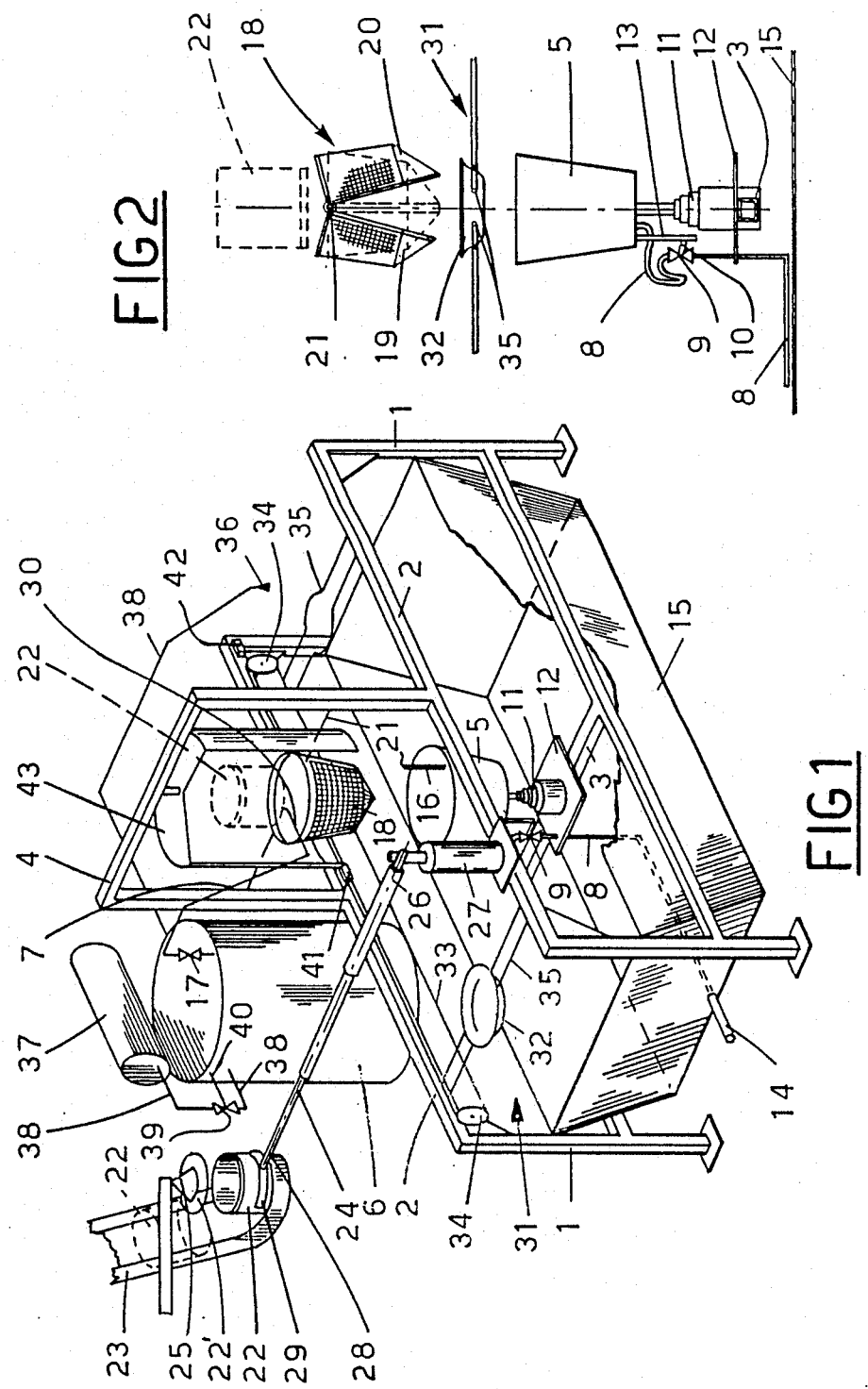

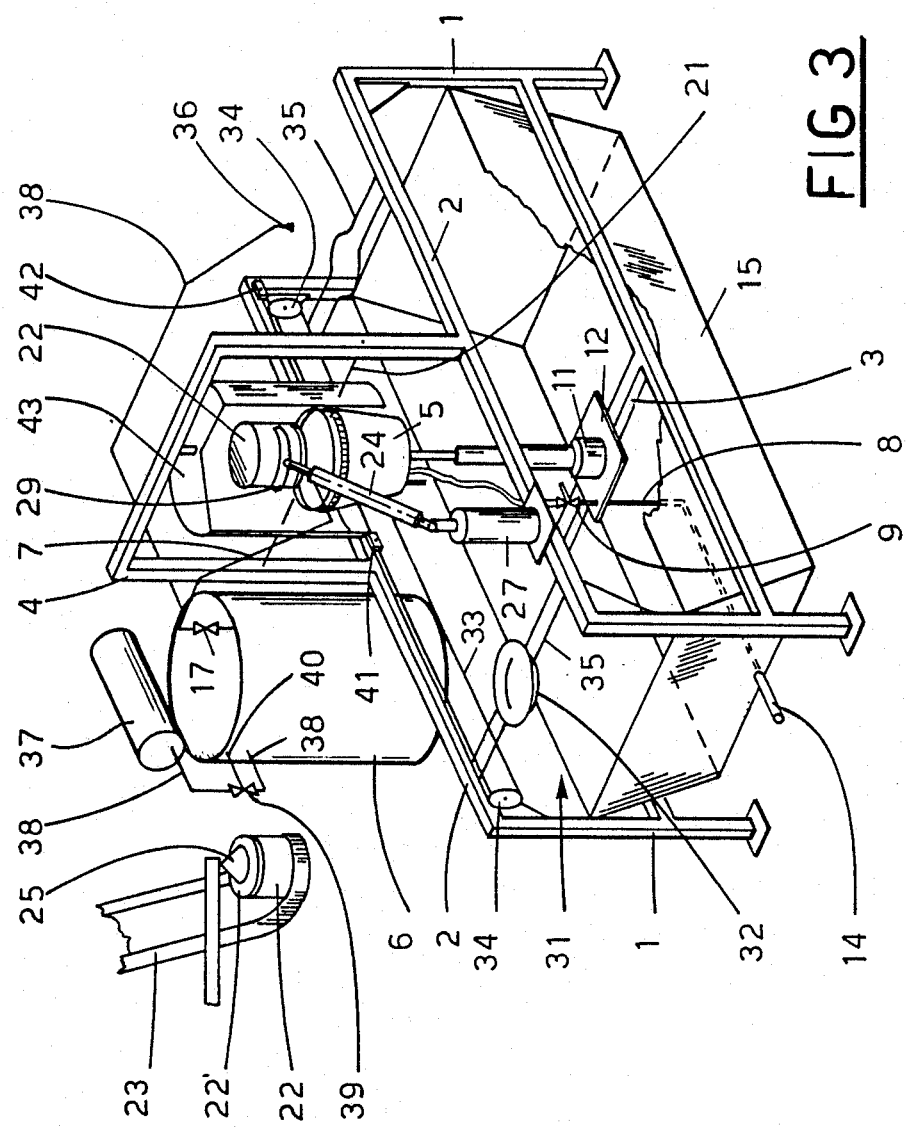

AUTOMATIC APPARATUS TO COOK AND SERVE READY-TO-EAT PASTA HELPINGS AFTER THE ITALIAN MANNER

FIELD AND BACKGROUND OF THE INVENTION

The present invention relates to an automatic apparatus to cook and serve ready-to-eat pasta helpings after the Italian manner, such as for example spaghetti, ravioli and the like.

The invention is therefore adapted to be used with best results in the collective refreshment field and particularly where communities such as canteens, railway stations, airports and schools are concerned.

It is known that the cooking of the above mentioned typical Italian dishes is currently carried out in a traditional manner by one or more specifically designed operators, according to a sequence of steps performed by hand and often in an extemporary manner. Consequently the result depends on the operator's skill and the quickness of the service on account of the number of helpings to make ready in the time unit, depends almost exclusively on the number of operators, which involves practical drawbacks pertaining to the quality of the supplied product as well as economical drawbacks due to the use of selected staff.

SUMMARY OF THE INVENTION

The main object of the present invention is to overcome the above specified drawbacks relating to known art, by providing an apparatus adapted to cook, season and serve pasta helpings after the Italian manner in a completely automatic fashion, which results in an improvement of the average quality of the product and quickness of the service offered and in a reduction of the respective operating costs.

The foregoing and still further objects are achieved by the automatic apparatus of the invention comprising: a cooking vessel adapted to contain hot water coming from a boiler through a feeding line and also having an evacuation pipe provided with an exhaust valve, said cooking vessel being associated with a drive mechanism adapted to cause the vessel to move vertically, according to predetermined operating steps, between a higher position and a lower position respectively; a basket adapted to contain a pasta helping to be cooked, disposed in register with the higher position of the cooking vessel, the sizes of said basket being smaller than those of the vessel so that it can be introduced thereinto when the cooking vessel is at its higher position; a charging device adapted to take up a container holding a previously metered pasta helping from a feed member, to transport it in register with the basket after an opening device has acted upon said container, and to discharge the contents thereof into the basket; a conveyer movable in a feed direction, designed to make a dish pass under the basket so that the latter may discharge a cooked pasta helping thereon; at least a condiment-dispensing member disposed downstream of the basket relative to the feed direction of the conveyer and designed to put a predetermined condiment quantity coming from a suitable tank through a feeding pipe on a pasta helping laid down on the dish.

BRIEF DESCRIPTION OF THE DRAWINGS

Further features and advantages of the present invention will become more apparent from the detailed description of a preferred embodiment given hereinafter by way of example only with the aid of the accompanying drawings, in which:

FIG. 1 is a diagrammatic isometric view of the apparatus of the invention in which the different members are disposed in a first characteristic position and certain parts are removed in order that others may be more prominent;

FIG. 2 is a diagrammatic side view of a detail of the apparatus showing the cooking vessel and basket;

FIG. 3 shows the apparatus seen in FIG. 1 with the different members disposed in a second characteristic position;

DESCRIPTION OF THE PREFERRED EMBODIMENT

Figure 4:
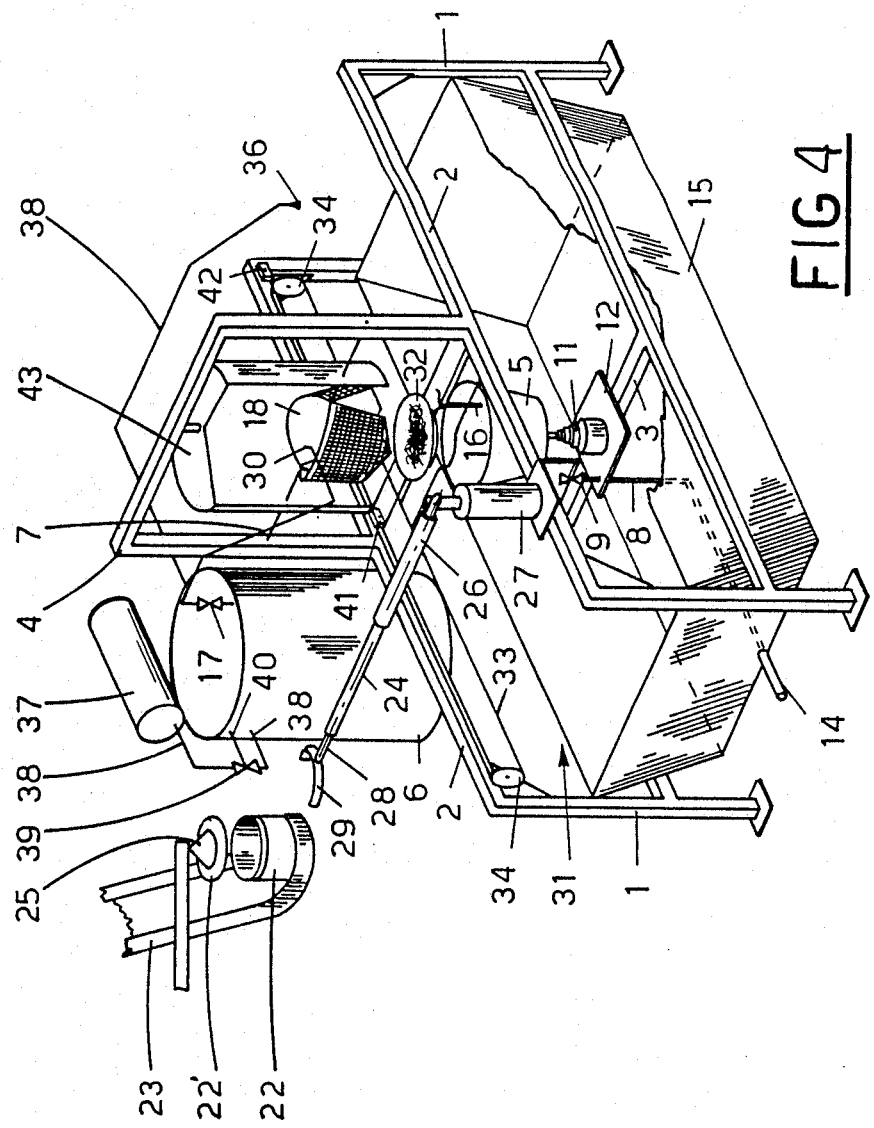
FIG. 4 shows the apparatus seen in FIG. 1 with the different members disposed in a third characteristic position.

Referring to the drawings a supporting structure substantially comprising a pair of parallel longitudinal members 2, a crosspiece 3 joining the longitudinal members 2 and an upper frame 4 has been globally identified by reference numeral 1.

A top-opened cooking vessel 5 of truncated conical form is mounted on the crosspiece 3; it is adapted to contain hot water coming, as more clearly seen in the following, from a boiler 6 through a feeding line 7. The cooking vessel 5 is provided at the bottom with an evacuation pipe 8 equipped with an exhaust valve 9 having a lever actuator 10 and it is associated with a drive mechanism 11 adapted to cause the vessel to move vertically between a higher position and a lower position respectively. In particular the drive mechanism 11 consists of a pneumatic jack having a vertical axis and fixed to a plate 12 carried by the crosspiece 3, and the rod of which is connected to the lower part of vessel 5.

The operation of the drive mechanism 11 achieved by means not shown for the sake of simplicity, takes place automatically according to predetermined operating steps as it is governed by an electronic control system not shown.

In FIGS. 1, 2, 4 and 5 vessel 5 is seen at its lower position, whereas in FIG. 3 it appears at its higher position.

It is to note that vessel 5 is provided at its lower part with a tailpiece 13 designed to act upon the lever actuator 10 causing the valve 9 to open and consequently allowing the water evacuation when vessel 5 is at its lower position.

As shown in FIG. 2, the evacuation pipe 8 has a flexible upper length to fit to the raising of vessel 5 and a lower stiff length located downstream of valve 9. The stiff length leads off to a drain pipe 14 located at the bottom of a basin 15 adapted to collect fluids accidentally spilled during the operating steps.

Inside vessel 5 an overflow probe 16 is provided which through the above mentioned electronic system controls the opening or closing of a valve 17 inserted in the hot water feeding line 7.

18 denotes a basket consisting of two substantially semicylindrical half-shells 19 and 20 (FIG. 2) having lower semi-frustoconical ends, which are mutually articulated and capable of rotating about a horizontal rod-like support 21 fixed to frame 4. Opening and closing of half-shells 19 and 20 takes place through a known system (not shown for the sake of simplicity) governed by the above mentioned electronic control system. Basket 18 is disposed in register with the higher position of vessel 5 and its sizes are slightly smaller than those of said vessel so that it can be introduced thereinto when vessel 5 is at its higher position.

Basket 18 is adapted to receive a single previously-metered pasta helping to be cooked which is held in a suitable container 22 coming from a store (for example a refrigeration room not shown) by means of a feed member consisting for example of a chute 23. Preferably container 22 is a stiff cylindrical box-shaped body provided with a removable lid 22'. Actually, being the container 22 in the form of a box it is easier to empty it when, as more clearly seen in the following, part of the pasta contained inside it should adhere to the container bottom or walls.

Each container 22 is individually taken up from chute 23 by a charging device 24 transporting it in register with basket 18 and discharging the contents thereof into said basket after an opening device 25 consisting of a pneumatic-operation sucker located close to chute 23, has acted upon lid 22'. The charging device 24 is comprised of a rectilinear substantially horizontal mechanical arm axially extendible by means of known pneumatic members. It has one end engaged to and suitable for turning about a vertical fixed support 27 and the other end 28 provided with a grasping means 29 consisting for example of known pliers, capable of rotating about the longitudinal axis of arm 24. More particularly the rotation of the grasping means about the axis of arm 24 takes place in the two ways that is clockwise and counterclockwise through 180° upon command of the electronic control system, when container 22 is located above basket 18.

It is to be noted that the admission of hot water inside the cooking vessel 5 takes place indirectly, that is sending the water through the container 22 overturned above the basket in order to allow the whole amount of pasta to detach from container 22, as above specified, and drop into basket 18.

As container 22 is overturned, with its open end directed downwardly, the water can fall through basket 18 into vessel 5. To this end the hot water feed line 7 is provided with a spray nozzle 30 located close to the basket 18 and positioned so that it is directed towards the inside of container 22 when the latter is above the basket 18.

The area in which hot water is introduced into the container 22 and the area surrounding the basket 18 are enclosed by a housing 43 supported by frame 4 so that possible water jets generated by nozzle 30 may remain therewithin. As shown in the drawing, the housing 43 has a wide side opening adapted to allow the introduction of container 22 thereinto.

A conveyer is identified at 31. It has a rectilinear movement along a horizontal feed direction parallel to the longitudinal members 2. The conveyer 31 causes a dish 32 coming from a store not shown to pass under basket 18 so that said basket may discharge a cooked pasta helping thereon. In greater detail, the conveyer 31 is comprised of a pair of flexible members 33 such as for example chains or belts endlessly mounted on powered pulleys 34 fixed to the longitudinal members 2 and disposed alongside of and under basket 18.

Said flexible members carry a series of support means 35 consisting for example of metal shaped strips adapted to support dishes 32 and disposed transversely to the feed direction of conveyer 31.

Switches 41 are provided on the longitudinal members 2 adjacent the basket 18; when they are intercepted by the support means 35 they cause the conveyer 31 to stop for a fixed period necessary to open the half-shells 19 and 20 of basket 18 and to complete the discharging of cooked pasta into the dish 32.

Figure 5:
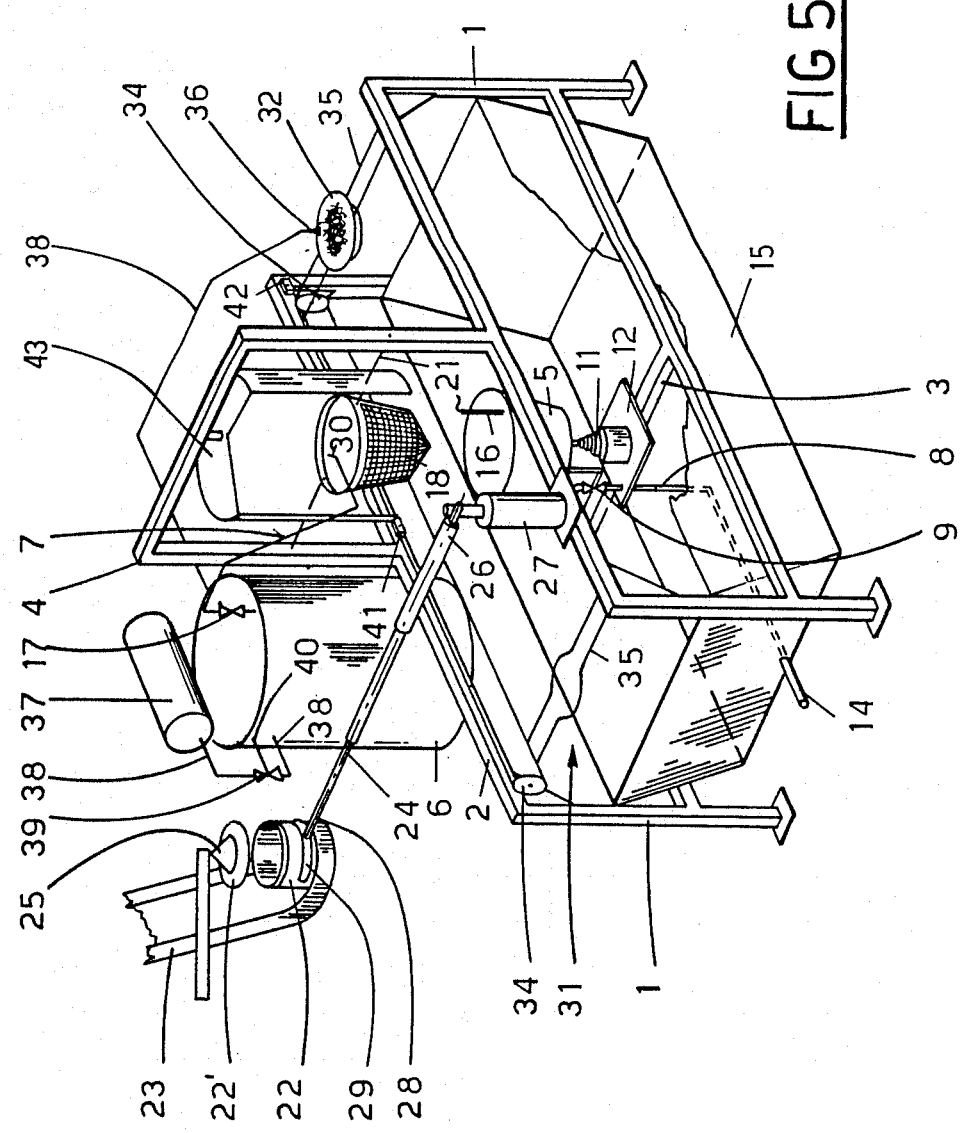
FIG. 5 shows the apparatus seen in FIG. 1 with the different members disposed in a fourth characteristic position.

Downstream of the basket 18 with respect to the feed direction of conveyer 31 there is a condiment-dispensing member 36 designed to put a predetermined condiment (such as for example tomato-sauce, ragout or the like) quantity coming from a suitable tank 37 through a feeding pipe 38 on a pasta helping laid down on the dish 32 (FIG. 5).

In this case too, switches 42 cause the conveyer 31 to stop close to the dispensing member 36, said switches being located on the longitudinal members 2 and intercepted by the support means 35.

In order to heat the condiment it is provided that the feeding pipe 38 downstream of the tank 37 with respect to the condiment flow direction should pass inside the boiler 6.

It is to be noted that a selector valve 39 connected to a hot water admission piping 40 coming from boiler 6 is located on the condiment feeding pipe 38, upstream of the boiler 6. Said selector valve 39 controlled by a timer associated with the electronic control system, causes the admission of hot water into the feeding pipe 38 when the apparatus has been at rest for a predetermined period of time (for example five minutes), for the purpose of preventing the feeding pipe 38 from clogging. The washing water coming out of the dispensing member 36 is collected in the basin 15 and then evacuated through the drain pipe 14.

Operation of the apparatus according to the invention described above mainly as regards structure is as follows.

During the first step shown in FIG. 1, the mechanical arm 24 takes up the container 22 after the sucker 25 has removed the lid 22' therefrom. Said lid will be then dropped into a suitable tray not shown. During tis step the vessel 5 is empty and located at its lower position and the basket half-shells 19 and 20 are closed.

During the second step shown in FIG. 3, the mechanic al arm 24 carries the container 22 above the basket 18 and rotates it through 180° so that pasta contained therein can be discharged into said basket. The vessel 5 is at its higher position and the basket 18 is located inside it. Hot water comes out of nozzle 30 by means of valve 17. Said water is projected upwardly within the container 22 and falls down, through the basket holes, into vessel 5. When a predetermined level has been reached, the probe 16 acts upon the valve 17 causing the hot water flow to stop. Basket 18 containing a pasta helping is still dipped in the hot water where it remains for a predetermined time necessary to cooking. A timer associated with an electronic control system performs this task.

During the third step shown in FIG. 4, the mechanical arm 24 comes back to its starting position after discharging the empty container 22 into a suitable tray (not shown). There is the lowering of vessel 5 to its lower position and, due to the tailpiece 13 acting on lever 10 of valve 9, the cooking water is evacuated. The conveyer 31 puts a dish 32 under the basket 18, the half-shells 19 and 20 are opened and a cooked pasta helping is laid down on the dish 32.

During the fourth step shown in FIG. 5, all members, except for the conveyer 31, are at their starting position as shown in FIG. 1. The conveyer 31 puts the dish 32 in register with the dispensing member 36 out of which comes the predetermined condiment quantity. At this point the dish can be removed by a consumer.

As already said, all operating steps are governed by an electronic control system which is not described in detail as it is not part of the present invention.

It is also to be noted that, in order to remarkably reduce the cooking time and consequently increase the apparatus productivity, helpings of precooked pasta may be advantageously put in containers 22 instead of dried or fresh pasta. In this way the cooking time can be reduced to approximately 30 seconds and the whole production cycle can be consequently shorter than one minute.

Under these conditions, if suitable structural contrivances are provided, the apparatus of the invention can advantageously be used as an automatic dispenser of pasta helpings cooked after the Italian manner.

It is obviously understood that in actual fact the present invention may take forms and configurations different from the embodiment described hereinbefore without departing from the scope of the inventive idea characterizing it.

Furthermore, all of the details can be replaced by technically equivalent elements and the sizes and materials used can be of any magnitude and nature, according to requirements.

What is claimed is:

1. An automatic apparatus to cook and serve ready-to-eat pasta helpings such as helpings of spaghetti, ravioli or the like differently seasoned, comprising: a cooking vessel for holding hot water coming from a boiler through a feeding line and also having an evacuation pipe provided with an exhaust valve, said cooking vessel being associated with a drive mechanism for causing the vessel to move vertically, according to the predetermined operating steps, between a higher position and a lower position respectively; a basket for holding a pasta helping to be cooked, disposed in register with the higher position of the cooking vessel, the sizes of said basket being smaller than those of the vessel so that it can be introduced thereinto when the cooking vessel is at its higher position; a charging device for taking up a container holding a previously metered pasta helping from a feed member, according to said predetermined operating steps, to transport it in register with the basket after an opening device has acted on the container, and to discharge the contents thereof into the basket; a conveyer movable in feed direction, according to said predetermined operating steps, designed to make a dish pass under the basket so that the latter may discharge a cooked pasta helping thereon; at least one condiment-dispensing member disposed downstream of the basket relative to the feed direction of the conveyer and designed to put a predetermined condiment quantity coming from a suitable tank through a feeding pipe on a pasta helping laid down on the dish.

2. The apparatus as claimed in claim 1, wherein said drive mechanism consists of a pneumatic jack having a vertical axis and said cooking vessel is fastened to the jack rod.

3. The apparatus as claimed in claim 1, wherein said exhaust valve is provided with a lever actuator the lever of which is contacted by said cooking vessel when the latter is at its lower position.

4. The apparatus as claimed in claim 1, wherein said basket is formed with two substantially semicylindrical half-shells provided with semi-frustoconical ends, which are articulated to each other and capable of rotating, according to said predetermined operating steps, about a horizontal axis.

5. The apparatus as claimed in claim 1, wherein said charging device is comprised of a mechanical arm having one end secured to a fixed support and its other end provided with a grasping means, said arm rotating, according to said predetermined operating steps, about said fixed support and said grasping means rotating about the longitudinal axis of said arm.

6. The apparatus as claimed in claim 1, wherein said hot water feed line is provided with a spray nozzle located in the vicinity of said basket in such a position that it is directed towards the inside of said container when said charging device puts the container in register with the basket.

7. The apparatus as claimed in claim 1, wherein said container consists of a stiff box-shaped body provided with a removable lid.

8. The apparatus as claimed in claim 1, wherein said container-opening device is a sucker.

9. The apparatus as claimed in claim 1, wherein said conveyer is comprised of a pair of flexible parallel members mounted endlessly on powered pulleys disposed alongside of said basket respectively and below the latter, said flexible members carrying a number of dish supporting means disposed transversely to the feed direction.

10. The apparatus as claimed in claim 1, wherein said condiment-feeding pipe downstream of said tank with respect to the condiment flow direction, passes inside said boiler.

11. The apparatus as claimed in claim 1, wherein a selector valve connected to a hot water admission piping coming from the boiler is located on the condiment feeding pipe, said selector valve causing the admission of water into said condiment feeding pipe when the apparatus has been at rest for a predetermined period of time.

* * * * *